Patented Nov. 24, 1953

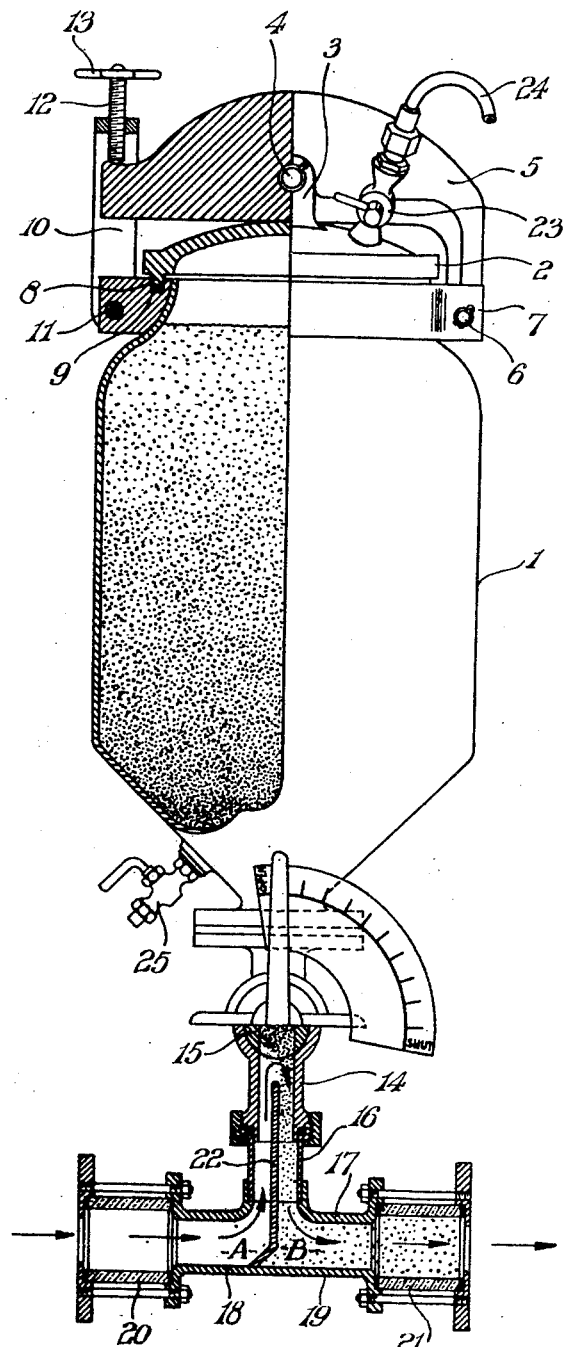

2,660,560

UNITED STATES PATENT OFFICE 2,660,560

MEANS AND METHOD FOR THE ADDITION
OF INSOLUBLE COMMINUTED SOLIDS TO
LIQUIDS FLOWING IN PIPES

Joseph A. Pickard, Hounslow, England, assignor to The Metafiltration Company Limited, Hounslow, England, a British company Application October 31, 1949, Serial No. 124,546

Claims priority, application Great Britain November 9, 1948

4 Claims. (Cl. 210—28)

This invention relates to a method of and means for automatically regulating the addition of solid ingredients to a liquid passing through a conduit.

The invention finds more particular application to filtration and separating devices, but other industrial applications are included in its scope.

There are numberless instances in the brewing, chemical and like trades where it is necessary to supply definite amounts of powdered material in a dry, pasty or suspended condition to a fluid passing through a conduit into a vessel, e. g. for filtration or the like, wherein the admixed ingredients may perform a mechanical or chemical function. Thus it is frequently necessary to add bleaching powder, alum, or powdered solid materials, e. g. kieselguhr or filter aid to water passing through pipes or conduits, and heretofore it has been the practice to prepare from such materials suspensions or solutions of definite concentration, to maintain the suspensions or solutions in even concentration by stirring, and to inject them into the flowing fluid by means of a positively acting pump or injector. This method of admixture presents several inconveniences, and it is by no means easy to regulate the amount of addition proportionally to the volume of liquid passing.

Particularly in connection with the addition of insoluble material to liquids undergoing filtration, a great deal of effort and ingenuity has been devoted to the provision of means for adding such materials to liquids flowing in pipes. Some of these devices operate on the batch principle and necessitate separate stirrers and pumps, and this type gives a diminishing weight of solid matter per unit of liquor as the addition proceeds. They also need constant attention. Other types depend on pump suction adjustment from an open tank containing the added material mechanically maintained in suspension with constant density. This type has some advantages but constant supervision is necessary and the employment of separate prime movers for stirring, pumping, and the like, and is not applicable to filtrations such as that of carbonated beer where the suspension has to be maintained under pressure.

According to the invention a method of effecting the controlled addition of solid materials to a liquid flowing through a pipe consists in mixing the solid materials in granulated or comminuted form with an enclosed column of the liquid and allowing said solid materials to settle under gravity at the base of said column; directing the flow of liquid in the pipe across the base of said column in contact with the lower face of the admixed liquid and solid to entrain in the flowing liquid the solids settling at the lower face of said column; and adjusting the area of the junction between the liquid column and the flowing liquid to vary the amount of solid materials entrained by and mixed with the liquid flowing in the pipe.

Whilst any means of connecting the base of an enclosed column of liquid with a body of fluid flowing in a pipe will effect the entrainment of solid materials gravitating towards the base of the liquid column, we have found it preferable to assist such entrainment by the positive creation of turbulence at the junction of the flowing liquid with the base of the column of admixed liquid and solid material.

The invention also provides for carrying into effect the controlled addition of solid materials to a liquid flowing in a pipe by the method described above, an apparatus wherein a closable container, adapted to be filled with the granulated or comminuted material, is provided at its base with an outlet closable by an adjustable valve the outlet from which latter communicates with the pipe, said pipe being formed so as to create a positive turbulence in the liquid immediately below said valve outlet when said liquid flows through said pipe.

Reference will now be made to the accompanying drawing which shows in part sectional elevation one preferred form of construction according to the invention.

The apparatus consists of a cylindrical vessel or container 1 closable at the top by means of a cover 2 which is pivotally mounted by means of lugs 3 on a pin 4 extending through a clamping bar 5 one end of which is hinged about a pin 6 mounted in a ring 7 secured by welding or like means to the upper end of the vessel 1. The cover 2 is formed with a downwardly extending annular flange 8 adapted to seat on a sealing ring 9 located in an annular recess in the upper face of the ring 7. The cover 2 is clamped with the flange 8 in engagement with the sealing ring 9 by means of a shackle 10 hinged about a pin 11 mounted in the ring 7 at a point diametrically opposed to the pin 6. A clamping screw 12 provided with a handwheel 13 serves for releasably securing the cover 2 and bar 5 in the clamped-down position as shown in the drawing.

The base of the vessel 1 is of inverted truncated conical form, terminating in an outlet, and secured thereto is a short conduit 14 in which is mounted a rotary plug valve 15.

Screwed to the lower end of the conduit 14 is the leg 16 of a T-branch conduit 17 the two other branches 18, 19 of said branch conduit 17 being provided with glass sight tubes 20, 21 respectively. The branch 18 is adapted to be connected to a pump supplying the liquid to which the solid material is to be added, and the branch 19 is adapted to be connected to the filter or the like to which the admixed liquid and solid material is to be delivered.

Within the short conduit 14 and the branch conduit 17, 18, 19 is arranged a wall or partition 22 which divides the space in said conduits into two passages A and B. The upper end of the wall 22 terminates at a point below the valve 15 such that when the valve 15 is closed liquid can pass freely from passage A into passage B along a channel of substantially constant cross section throughout.

Arranged in the cover 2 is an air vent cock 23 to which is connected a discharge pipe 24, whilst a drain cock 25 is preferably provided at the base of the conical portion of the vessel 1 to enable the vessel to be flushed out.

In operation the valve 15 is first closed, the cover 2 of the container lifted off and the powdered material to be added to the liquid placed in the container 1. The cover 2 is then replaced and the valve below the container rotated to allow communication between the vessel 1 and passages A and B. Liquid flows into the container displacing the air in it, which is allowed to escape through the air vent cock 23, and creating a suspension of the powdered material in the liquid. It will be understood that, although passage B is open during this operation, the flow of liquid into the container 1 prevents the discharge therefrom of any solid material into the passage B. As soon as the vessel 1 is filled the cock 23 is shut and the valve 15 is closed, in order to allow the solid material to settle out from the liquid towards the base of the vessel 1. When a sufficient quantity of the material has settled the valve 15 is adjusted to open the passage B to the desired degree. As the liquid passing from passage A to passage B has to make a change in direction immediately under the valve 15, the resulting turbulence in the liquid will, according to the adjustment of the valve, wash out of the vessel through the port of the valve 15 a greater or less amount of the solid material which is continuously settling in the base of the vessel 1. The amount washed out per minute continues very nearly constant with a constant rate of flow. This is due to the fact that the solids in the container settle down to a closely packed mass on the upper side of the plug of the valve 15. The mass is eroded by the turbulent liquid, the erosion being made good by settlement as soon as enough solid has been removed to form a cavity.

It has been found that it is preferable for the angle between the walls of the conical base of the vessel 1 to be between 45° and 60°. Below an angle of about 45° the granular material tends to be stably supported on the wall of the cone and does not slip down towards the valve opening.

The proportion of solid added to the flowing liquid depends upon the setting of the valve 15, and conditions may be selected so that very nearly the same percentage of addition is made, notwithstanding that the flow of the liquid through the pipe may vary within wide limits. The amount of addition may be judged by eye through the sight glasses 20, 21, one on the incoming and one on the outgoing side of the T branch 17.

The device may also be employed for the addition of large quantities of solids in a few minutes. For instance in the case of a filter on which a filter bed is to be formed, an aperture of large dimensions is provided at the bottom of the container. It is in fact possible with one and the same valve to deliver the whole contents of the container into the liquid in times varying between two or three minutes and several hours. After the whole of the solid material has been evacuated from the container, the valve 15 is closed, the container 1 opened, and any remaining contents drained out through the cock 25. A further charge of dry solids is then added, and the process repeated.

I claim:

1. An apparatus for the controlled addition of insoluble comminuted solid materials to a liquid channel, comprising in combination; a pipe through which the liquid flows, a closable container formed with an outlet at the base thereof; a T junction pipe connected by the leg thereof to said container outlet and connected by its other two branches into the pipe supplying liquid; an adjustable valve arranged in the said leg of the junction pipe; and a partition arranged longitudinally in said junction pipe and terminating at a point near the outlet of said valve to create turbulence in liquid flowing past said valve when open, said partition being transversely disposed in the pipe and being arranged to separate the space within said junction pipe into two longitudinal passages, one leading from one branch of said junction pipe to a point immediately below said valve outlet and the other from said point to the other branch of said junction pipe.

2. Apparatus according to claim 1, wherein said container has a base of inverted conical shape, the angle between the sloping walls being between 45° and 60° approximately.

3. A method of introducing in a controlled manner insoluble comminuted solid materials into a liquid flowing in a flow line comprising the steps of mixing the solid materials in finely divided form with an enclosed column of the liquid, allowing said solid materials to settle solely by the action of gravity at the base of the column and forming a lower face of the admixed liquid and solid at the base, directing the entire flow of liquid in the line toward the column axially thereof, across the base of the column in contact with the lower face of the admixed liquid and solid to entrain in the flowing liquid the solids settling at the lower face of the column and away from the column, and adjusting the area of the junction between the liquid column and the flowing liquid to vary the amount of solid materials entrained by and mixed with the liquid flowing in the flow line.

4. A method of effecting the controlled addition, to a liquid flowing in a flow line, of insoluble comminuted solid materials of a specific gravity greater than the liquid, which consists in mixing the said comminuted solid materials with an enclosed column of the liquid and allowing said solid materials to settle under gravity towards a single outlet at the base of said column and forming a lower face of the admixed liquid and solid at the base; directing the flow of liquid in the flow line past said outlet in contact with the lower face of the admixed liquid and solid materials to entrain in the flowing liquid the solids settling under gravity at the lower face of said column; positively creating turbulence at the junction between the liquid column and the flowing liquid, to assist entrainment of said solid material; and adjusting the area of the junction between the liquid column and the flowing liquid to vary the amount of solid materials entrained by and mixed with the liquid flowing in the flow line.

JOSEPH A. PICKARD.

References Cited in the file of this patent

UNITED STATES PATENTS

| Number | Name | Date |
|---|---|---|
| 528,441 | Muller | Oct. 30, 1894 |
| 572,724 | Rumely | Dec. 8, 1896 |
| 1,409,248 | Sevcik | Mar. 14, 1922 |
| 2,216,921 | Marvel | Oct. 8, 1940 |
| 2,266,902 | Perkins | Dec. 23, 1941 |
| 2,462,886 | Morrow | Mar. 1, 1949 |
| 2,573,576 | Klumb | Oct. 30, 1951 |
| 2,584,395 | Marvel | Feb. 8, 1952 |

FOREIGN PATENTS

| Number | Country | Date |
|---|---|---|
| 23,258 | Great Britain | 1904 |
| 6707/27 | Australia | Apr. 2, 1928 |
| 57,265 | Germany | June 26, 1891 |
| 179,949 | Germany | Jan. 4, 1907 |